US012628074B2

(12) United States Patent
Choi et al.

(10) Patent No.: US 12,628,074 B2
(45) Date of Patent: May 12, 2026

(54) TARGET NETWORK SLICE INFORMATION FOR TARGET NETWORK SLICES

(71) Applicant: Lenovo (Singapore) PTE. LTD., New Tech Park (SG)

(72) Inventors: Hyung-Nam Choi, Ottobrunn (DE); Genadi Velev, Darmstadt (DE); Joachim Loehr, Wiesbaden (DE); Prateek Basu Mallick, Dreieich (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 461 days.

(21) Appl. No.: 17/919,442

(22) PCT Filed: Apr. 16, 2021

(86) PCT No.: PCT/IB2021/053171
§ 371 (c)(1),
(2) Date: Oct. 17, 2022

(87) PCT Pub. No.: WO2021/209976
PCT Pub. Date: Oct. 21, 2021

(65) Prior Publication Data
US 2023/0156584 A1 May 18, 2023

Related U.S. Application Data

(60) Provisional application No. 63/011,011, filed on Apr. 16, 2020.

(51) Int. Cl.
*H04W 48/18* (2009.01)
*H04W 24/02* (2009.01)
(Continued)

(52) U.S. Cl.
CPC ........... *H04W 48/18* (2013.01); *H04W 24/02* (2013.01); *H04W 48/16* (2013.01); *H04W 72/20* (2023.01)

(58) Field of Classification Search
CPC ..... H04W 24/02; H04W 48/16; H04W 48/18; H04W 72/20
(Continued)

(56) References Cited

U.S. PATENT DOCUMENTS 10,595,268 B2   3/2020   Lee et al.
11,997,634 B2 *  5/2024   Lee ........................ H04W 48/18
(Continued)

FOREIGN PATENT DOCUMENTS

WO      2018231027 A1    12/2018
WO      2020001437 A1     1/2020

OTHER PUBLICATIONS

PCT/IB2021/053171, "Notification of Transmittal of the International Search Report and the Written Opinion of the International Searching authority, or the Declaration", International Searching Authority, Jul. 14, 2021, pp. 1-16.
(Continued)

*Primary Examiner* — Robert J Lopata
(74) *Attorney, Agent, or Firm* — Kunzler Needham Hilton

(57) ABSTRACT

Apparatuses, methods, and systems are disclosed for target network slice information for target network slices. One method includes receiving a first message from a communication device including information indicating a request to register multiple network slices. The method includes determining target network slice information corresponding to multiple target network slices. The target network slice information includes information indicating network slices of the multiple network slices not supported in an area in which the communication device is located and a frequency
(Continued)

specific configuration associated with the multiple target network slices. The method includes transmitting a second message to a radio network entity including the target network slice information and the associated frequency specific configuration.

18 Claims, 13 Drawing Sheets

(51) Int. Cl.
    *H04W 48/16*         (2009.01)
    *H04W 72/20*         (2023.01)

(58) Field of Classification Search
    USPC ........................................................ 370/329
    See application file for complete search history.

(56)              References Cited

U.S. PATENT DOCUMENTS

| | | | |
|---|---|---|---|
| 2020/0120547 A1* | 4/2020 | Han | H04W 36/0083 |
| 2021/0037455 A1* | 2/2021 | Zhu | H04W 76/27 |
| 2022/0264505 A1* | 8/2022 | Ianev | H04W 48/18 |
| 2022/0279436 A1* | 9/2022 | Futaki | H04W 48/20 |
| 2022/0322221 A1* | 10/2022 | Ianev | H04W 76/11 |
| 2022/0377659 A1* | 11/2022 | Venkataraman | H04W 48/20 |
| 2023/0040440 A1* | 2/2023 | Xu | H04W 76/10 |
| 2023/0074413 A1* | 3/2023 | Chun | H04W 24/10 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Services and System Aspects; Study on enhancement of network slicing; Phase 2 (Release 17)", 3GPP TR 23.700-40 V0.3.0, Jan. 2020, pp. 1-62.

3GPP, "3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1, Mar. 2020, pp. 1-368.

3GPP, "3rd Generation Partnership Project; Technical Specification Group Radio Access Network; NR; Radio Resource Control (RRC) protocol specification (Release 15)", 3GPP TS 38.331 V15.9.0, Mar. 2020, pp. 1-536.

3GPP, "3rd Generation Partnership Project; Technical Specification Group Radio Access Network; NG-RAN; NG Application Protocol (NGAP) (Release 16)", 3GPP TS 38.413 V16.1.0, Mar. 2020, pp. 1-341.

GSMA, "Generic Network Slice Template Version 2.0", GSM Association Non-confidential Official Document NG.116—Generic Network Slice Template, Oct. 16, 2019, pp. 1-61.

Huawei, Hisilicon, "Slice Availability for Cell (Re-)Selection", 3GPP TSG-RAN WG2#99 R2-1708927, Aug. 21-25, 2017, pp. 1-4.

CMCC, "Motivation for new SI: Study on enhancement of RAN slicing", 3GPP TSG RAN Meeting #85 RP-191780, Sep. 16-20, 2019, pp. 1-8.

CMCC, Verizon, "Study on enhancement of RAN Slicing", 3GPP TSG-RAN meeting #86 RP-193254, Dec. 9-12, 2019, pp. 1-4.

Nokia, Nokia Shanghai Bell, "Discussion on network/cell selection for specific network slice(s)", 3GPP Tsg-Sa WG1 Meeting #89e S1-201059, Feb. 10 - 14, 2020, pp. 1-2.

* cited by examiner

100

104

104

102

104

102

102

200

300

400

| UE | Source | Target | AMF |
| 402 | RAN | RAN | 408 |
| | Node | Node | |
| | 404 | 406 | |

410

412

414

416

418

420

422

424

426

428

500

| UE 502 | Source RAN Node 504 | Target RAN Node 506 | AMF 508 |

510

512 → 514 →

← 516

← 518

520

522 → 524 →

← 526

600

| UE 602 | Source RAN Node 604 | Target RAN Node 606 | AMF 608 |
|---|---|---|---|

610

612

614

616

618

620

622

624

626

628

630

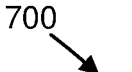
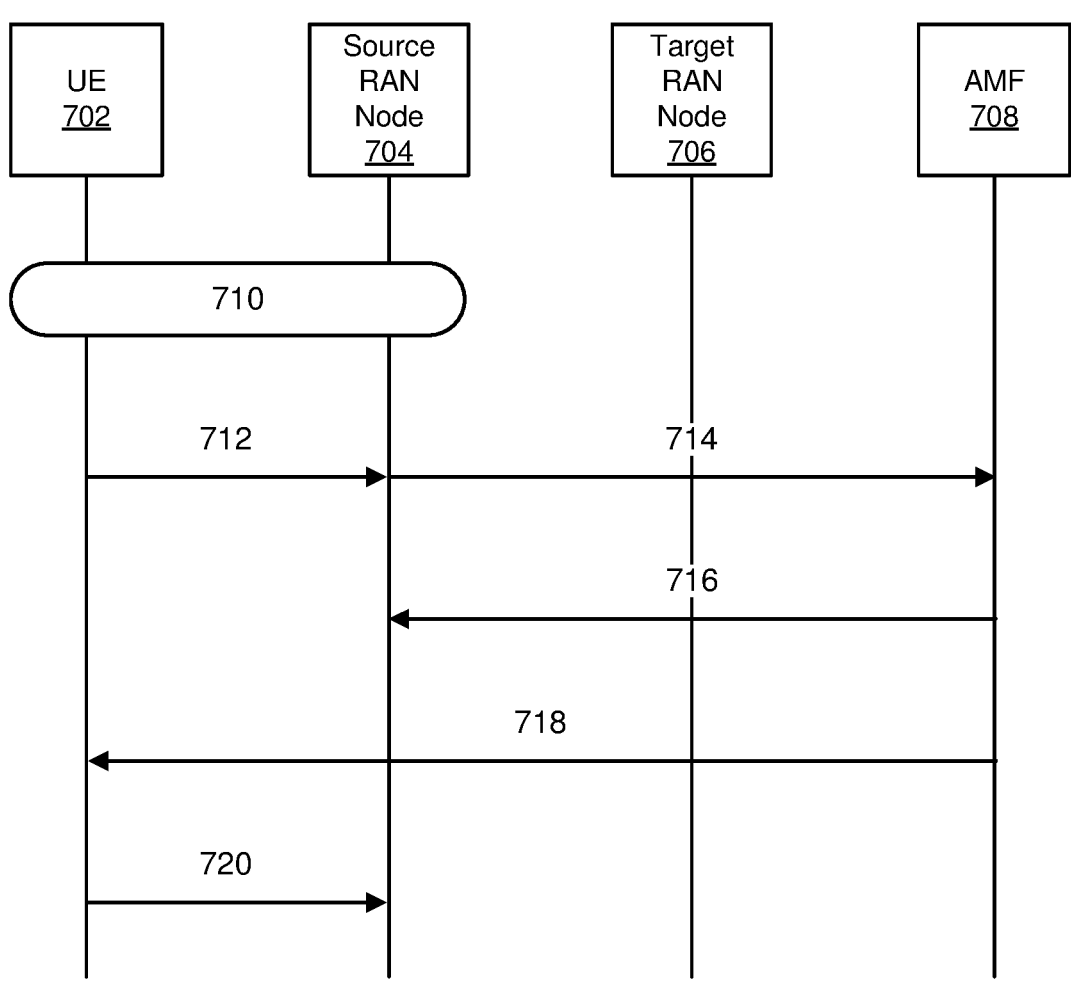
FIG. 7

800

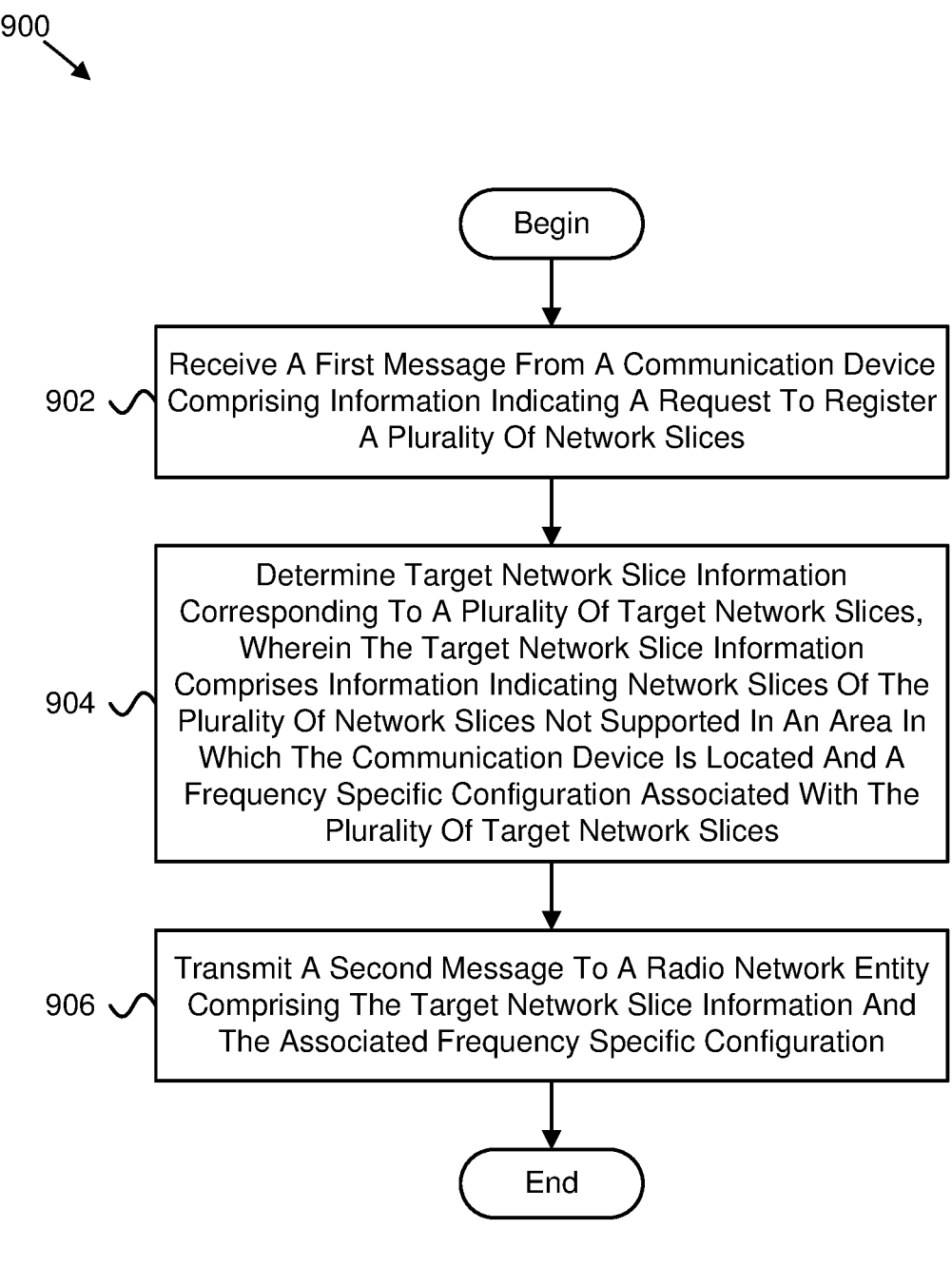

900

Begin

902 Receive A First Message From A Communication Device Comprising Information Indicating A Request To Register A Plurality Of Network Slices 904 Determine Target Network Slice Information Corresponding To A Plurality Of Target Network Slices, Wherein The Target Network Slice Information Comprises Information Indicating Network Slices Of The Plurality Of Network Slices Not Supported In An Area In Which The Communication Device Is Located And A Frequency Specific Configuration Associated With The Plurality Of Target Network Slices 906 Transmit A Second Message To A Radio Network Entity Comprising The Target Network Slice Information And The Associated Frequency Specific Configuration End

FIG. 9

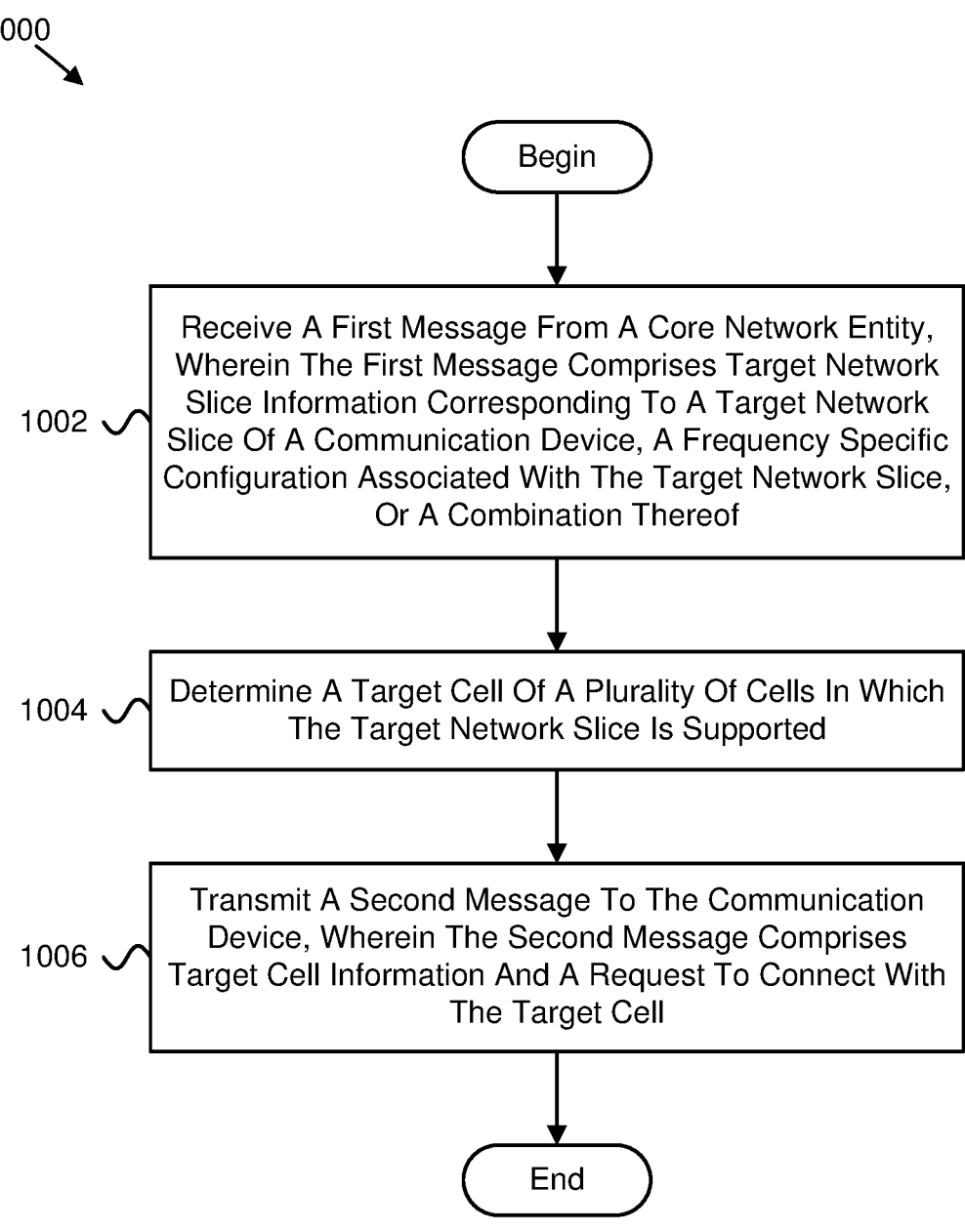

1000

Begin

1002 — Receive A First Message From A Core Network Entity, Wherein The First Message Comprises Target Network Slice Information Corresponding To A Target Network Slice Of A Communication Device, A Frequency Specific Configuration Associated With The Target Network Slice, Or A Combination Thereof 1004 — Determine A Target Cell Of A Plurality Of Cells In Which The Target Network Slice Is Supported 1006 — Transmit A Second Message To The Communication Device, Wherein The Second Message Comprises Target Cell Information And A Request To Connect With The Target Cell End

FIG. 10

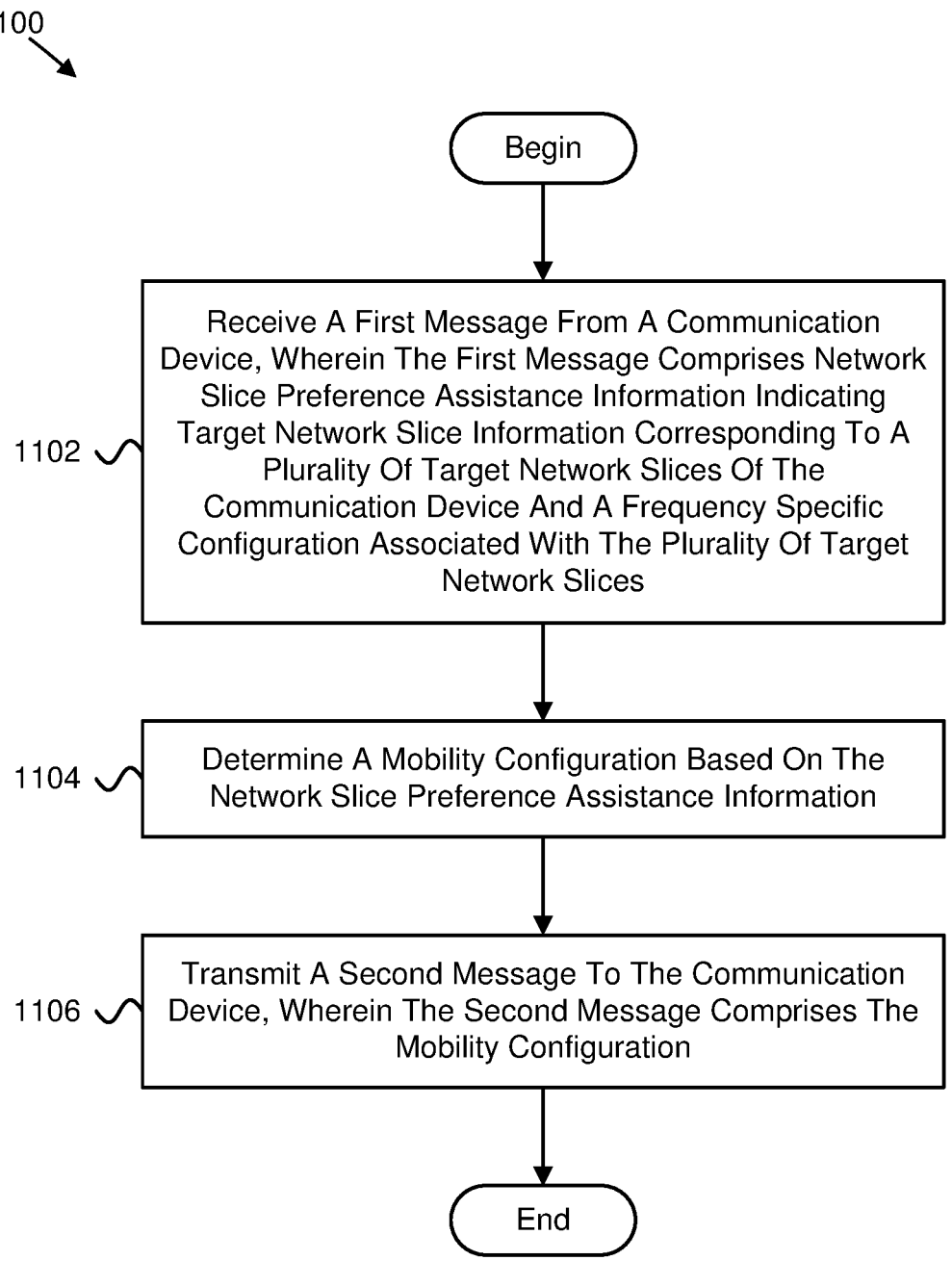

1100

Begin

1102   Receive A First Message From A Communication Device, Wherein The First Message Comprises Network Slice Preference Assistance Information Indicating Target Network Slice Information Corresponding To A Plurality Of Target Network Slices Of The Communication Device And A Frequency Specific Configuration Associated With The Plurality Of Target Network Slices 1104   Determine A Mobility Configuration Based On The Network Slice Preference Assistance Information 1106   Transmit A Second Message To The Communication Device, Wherein The Second Message Comprises The Mobility Configuration End

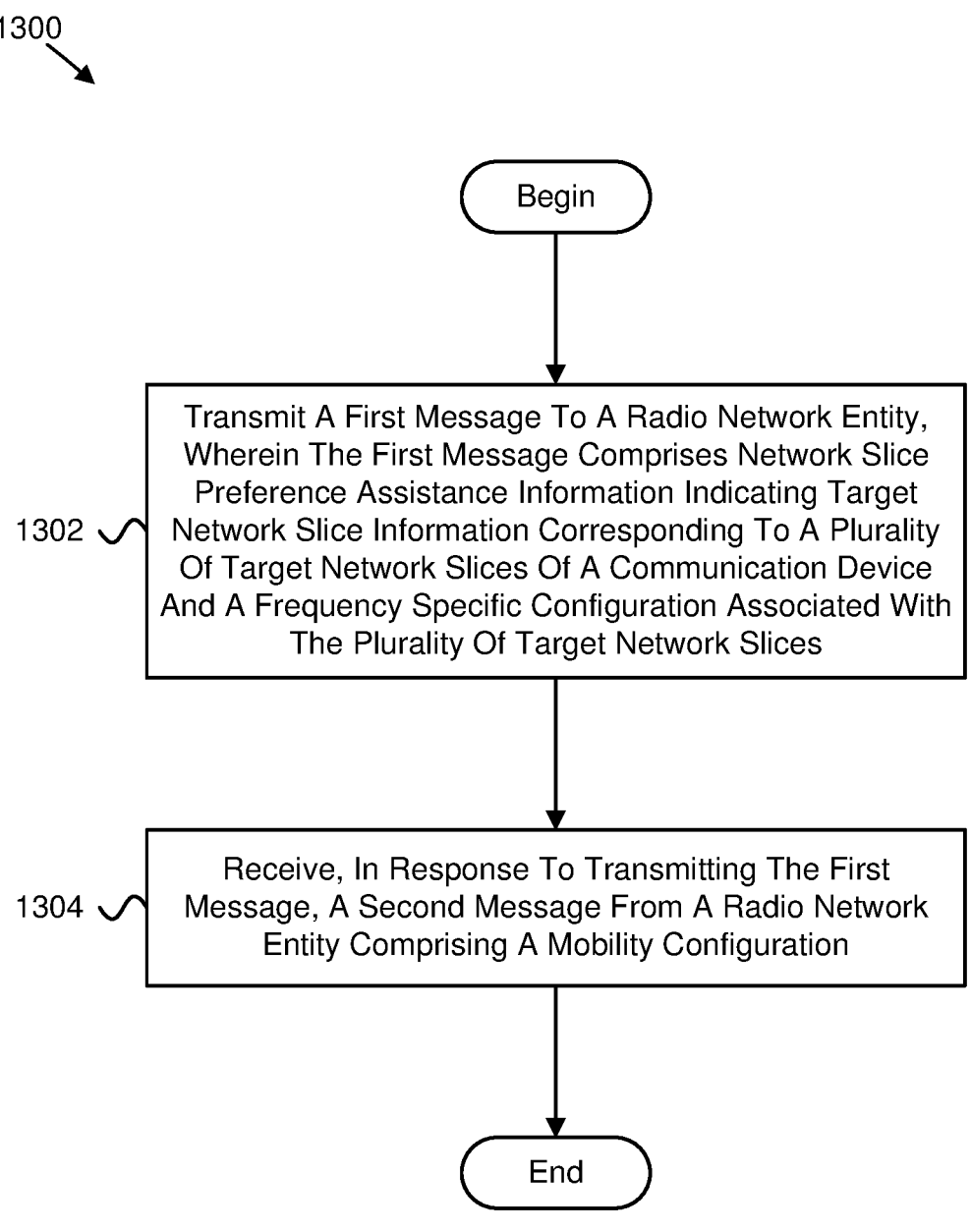

Begin

1302 — Transmit A First Message To A Radio Network Entity, Wherein The First Message Comprises Network Slice Preference Assistance Information Indicating Target Network Slice Information Corresponding To A Plurality Of Target Network Slices Of A Communication Device And A Frequency Specific Configuration Associated With The Plurality Of Target Network Slices 1304 — Receive, In Response To Transmitting The First Message, A Second Message From A Radio Network Entity Comprising A Mobility Configuration End

FIG. 13

TARGET NETWORK SLICE INFORMATION FOR TARGET NETWORK SLICES

CROSS-REFERENCE TO RELATED APPLICATIONS

This application claims priority to U.S. Patent Application Ser. No. 63/011,011 entitled "APPARATUSES, METHODS, AND SYSTEMS FOR NETWORK-CONTROLLED RADIO FREQUENCY BAND SPECIFIC SLICE SELECTION" and filed on Apr. 16, 2020 for Hyung-Nam Choi, which is incorporated herein by reference in its entirety.

FIELD

The subject matter disclosed herein relates generally to wireless communications and more particularly relates to target network slice information for target network slices.

BACKGROUND

In certain wireless communications networks, cell selection may be performed with cells operating in frequency bands. A user equipment ("UE") performing cell selection may not know certain helpful information for performing cell selection.

BRIEF SUMMARY

Methods for target network slice information for target network slices are disclosed. Apparatuses and systems also perform the functions of the methods. One embodiment of a method includes receiving a first message from a communication device comprising information indicating a request to register a plurality of network slices. In some embodiments, the method includes determining target network slice information corresponding to a plurality of target network slices, wherein the target network slice information comprises information indicating network slices of the plurality of network slices not supported in an area in which the communication device is located and a frequency specific configuration associated with the plurality of target network slices. In certain embodiment, the method includes transmitting a second message to a radio network entity comprising the target network slice information and the associated frequency specific configuration.

One apparatus for target network slice information for target network slices includes a receiver configured to receive a first message from a communication device comprising information indicating a request to register a plurality of network slices. In various embodiments, the apparatus includes a processor configured to determine target network slice information corresponding to a plurality of target network slices, wherein the target network slice information comprises information indicating network slices of the plurality of network slices not supported in an area in which the communication device is located and a frequency specific configuration associated with the plurality of target network slices. In certain embodiments, the apparatus includes a transmitter configured to transmit a second message to a radio network entity comprising the target network slice information and the associated frequency specific configuration.

Another embodiment of a method for target network slice information for target network slices includes receiving a first message from a core network entity, wherein the first message comprises target network slice information corresponding to a target network slice of a communication device, a frequency specific configuration associated with the target network slice, or a combination thereof. In some embodiments, the method includes determining a target cell of a plurality of cells in which the target network slice is supported. In various embodiments, the method includes transmitting a second message to the communication device, wherein the second message comprises target cell information and a request to connect with the target cell.

Another apparatus for target network slice information for target network slices includes a receiver configured to receive a first message from a core network entity, wherein the first message comprises target network slice information corresponding to a target network slice of a communication device, a frequency specific configuration associated with the target network slice, or a combination thereof. In various embodiments, the apparatus includes a processor configured to determine a target cell of a plurality of cells in which the target network slice is supported. In certain embodiments, the apparatus includes a transmitter configured to transmit a second message to the communication device, wherein the second message comprises target cell information and a request to connect with the target cell.

A further embodiment of a method for target network slice information for target network slices includes receiving a first message from a communication device, wherein the first message comprises network slice preference assistance information indicating target network slice information corresponding to a plurality of target network slices of the communication device and a frequency specific configuration associated with the plurality of target network slices. In some embodiments, the method includes determining a mobility configuration based on the network slice preference assistance information. In various embodiments, the method includes transmitting a second message to the communication device, wherein the second message comprises the mobility configuration.

A further apparatus for target network slice information for target network slices includes a receiver configured to receive a first message from a communication device, wherein the first message comprises network slice preference assistance information indicating target network slice information corresponding to a plurality of target network slices of the communication device and a frequency specific configuration associated with the plurality of target network slices. In various embodiments, the apparatus includes a processor configured to determine a mobility configuration based on the network slice preference assistance information. In certain embodiments, the apparatus includes a transmitter configured to transmit a second message to the communication device, wherein the second message comprises the mobility configuration.

Another embodiment of a method for target network slice information for target network slices includes transmitting a first message to a core network entity, wherein the first message comprises information indicating a request to register a plurality of network slices. In some embodiments, the method includes receiving, in response to transmitting the first message, a second message comprising target slice information. In certain embodiments, the method includes determining a frequency specific network slice of the plurality of network slices based on the second message. In various embodiments, the method includes performing cell reselection with a cell of the frequency specific network slice. In some embodiments, the method includes transmitting a third message to the core network entity, wherein the third message comprises information indicating network slices of the plurality of network slices to register, a service to establish, or a combination thereof.

Another apparatus for target network slice information for target network slices includes a transmitter configured to transmit a first message to a core network entity, wherein the first message comprises information indicating a request to register a plurality of network slices. In various embodiments, the apparatus includes a receiver configured to receive, in response to transmitting the first message, a second message comprising target slice information. In certain embodiments, the apparatus includes a processor configured to: determine a frequency specific network slice of the plurality of network slices based on the second message; and perform cell reselection with a cell of the frequency specific network slice. In some embodiments, the transmitter is configured to transmit a third message to the core network entity, and the third message comprises information indicating network slices of the plurality of network slices to register, a service to establish, or a combination thereof.

A further embodiment of a method for target network slice information for target network slices includes transmitting a first message to a radio network entity, wherein the first message comprises network slice preference assistance information indicating target network slice information corresponding to a plurality of target network slices of a communication device and a frequency specific configuration associated with the plurality of target network slices. In some embodiments, the method includes receiving, in response to transmitting the first message, a second message from a radio network entity comprising a mobility configuration.

A further apparatus for target network slice information for target network slices includes a transmitter configured to transmit a first message to a radio network entity, wherein the first message comprises network slice preference assistance information indicating target network slice information corresponding to a plurality of target network slices of a communication device and a frequency specific configuration associated with the plurality of target network slices. In various embodiments, the apparatus includes a receiver configured to receive, in response to transmitting the first message, a second message from a radio network entity comprising a mobility configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a communication diagram illustrating yet another embodiment of communications for cell selection;

FIG. 9 is a flow chart diagram illustrating one embodiment of a method for using target network slice information for target network slices;

FIG. 10 is a flow chart diagram illustrating another embodiment of a method for using target network slice information for target network slices;

FIG. 11 is a flow chart diagram illustrating a further embodiment of a method for using target network slice information for target network slices;

FIG. 13 is a flow chart diagram illustrating another embodiment of a method for using target network slice information for target network slices.

DETAILED DESCRIPTION

Figure 1:
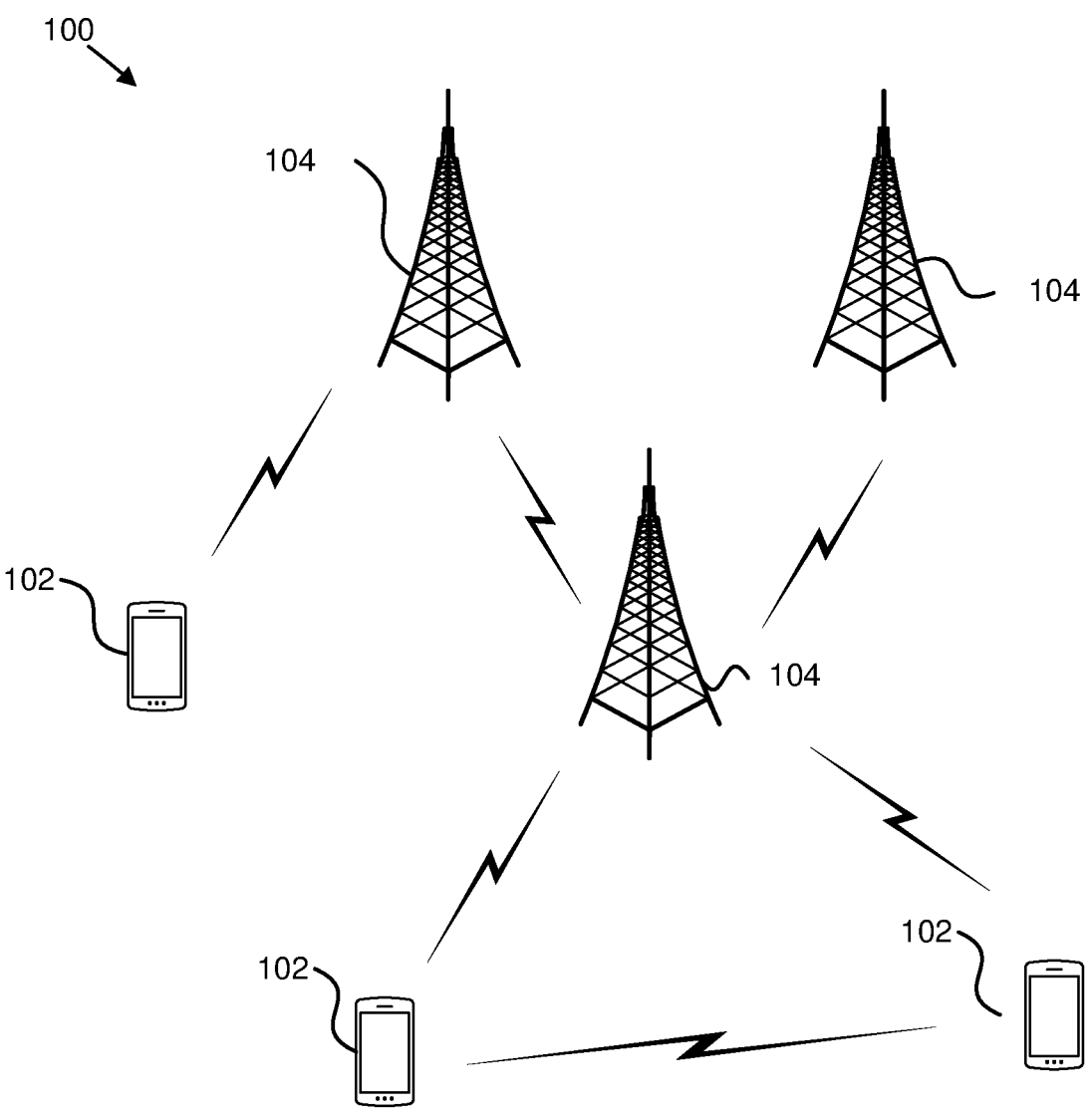
FIG. 1 is a schematic block diagram illustrating one embodiment of a wireless communication system for target network slice information for target network slices.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for target network slice information for target network slices. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive a first message from a communication device comprising information indicating a request to register a plurality of network slices. In some embodiments, the network unit 104 may determine target network slice information corresponding to a plurality of target network slices, wherein the target network slice information comprises information indicating network slices of the plurality of network slices not supported in an area in which the communication device is located and a frequency specific configuration associated with the plurality of target network slices. In certain embodiment, the network unit 104 may transmit a second message to a radio network entity comprising the target network slice information and the associated frequency specific configuration. Accordingly, the network unit 104 may be used for target network slice information for target network slices.

In certain embodiments, a network unit 104 may receive a first message from a core network entity, wherein the first message comprises target network slice information corresponding to a target network slice of a communication device, a frequency specific configuration associated with the target network slice, or a combination thereof. In some embodiments, the network unit 104 may determine a target cell of a plurality of cells in which the target network slice is supported. In various embodiments, the network unit 104 may transmit a second message to the communication device, wherein the second message comprises target cell information and a request to connect with the target cell. Accordingly, the network unit 104 may be used for target network slice information for target network slices.

In various embodiments, a network unit 104 may receive a first message from a communication device, wherein the first message comprises network slice preference assistance information indicating target network slice information corresponding to a plurality of target network slices of the communication device and a frequency specific configuration associated with the plurality of target network slices. In some embodiments, the network unit 104 may determine a mobility configuration based on the network slice preference assistance information. In various embodiments, the network unit 104 may transmit a second message to the communication device, wherein the second message comprises the mobility configuration. Accordingly, the network unit 104 may be used for target network slice information for target network slices.

In certain embodiments, a remote unit 102 may transmit a first message to a core network entity, wherein the first message comprises information indicating a request to register a plurality of network slices. In some embodiments, the remote unit 102 may receive, in response to transmitting the first message, a second message comprising target slice information. In certain embodiments, the remote unit 102 may determine a frequency specific network slice of the plurality of network slices based on the second message. In various embodiments, the remote unit 102 may perform cell reselection with a cell of the frequency specific network slice. In some embodiments, the remote unit 102 may transmit a third message to the core network entity, wherein the third message comprises information indicating network slices of the plurality of network slices to register, a service to establish, or a combination thereof. Accordingly, the remote unit 102 may be used for target network slice information for target network slices.

In various embodiments, a remote unit 102 may transmit a first message to a radio network entity, wherein the first message comprises network slice preference assistance information indicating target network slice information corresponding to a plurality of target network slices of a communication device and a frequency specific configuration associated with the plurality of target network slices. In some embodiments, the remote unit 102 may receive, in response to transmitting the first message, a second message from a radio network entity comprising a mobility configuration. Accordingly, the remote unit 102 may be used for target network slice information for target network slices.

Figure 2:
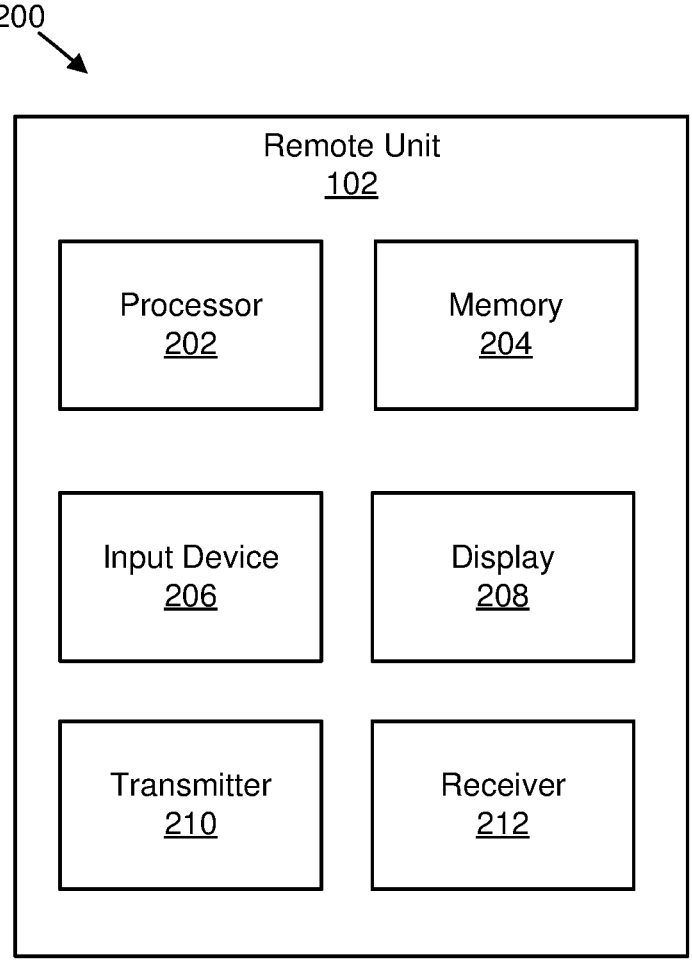
FIG. 2 is a schematic block diagram illustrating one embodiment of an apparatus that may be used for target network slice information for target network slices.

FIG. 2 depicts one embodiment of an apparatus 200 that may be used for target network slice information for target network slices. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 is configured to transmit a first message to a core network entity, wherein the first message comprises information indicating a request to register a plurality of network slices. In various embodiments, the receiver 212 is configured to receive, in response to transmitting the first message, a second message comprising target slice information. In certain embodiments, the processor 202 is configured to: determine a frequency specific network slice of the plurality of network slices based on the second message; and perform cell reselection with a cell of the frequency specific network slice. In some embodiments, the transmitter 210 is configured to transmit a third message to the core network entity, and the third message comprises information indicating network slices of the plurality of network slices to register, a service to establish, or a combination thereof.

In various embodiments, the transmitter 210 is configured to transmit a first message to a radio network entity, wherein the first message comprises network slice preference assistance information indicating target network slice information corresponding to a plurality of target network slices of a communication device and a frequency specific configuration associated with the plurality of target network slices. In various embodiments, the receiver 212 is configured to receive, in response to transmitting the first message, a second message from a radio network entity comprising a mobility configuration.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
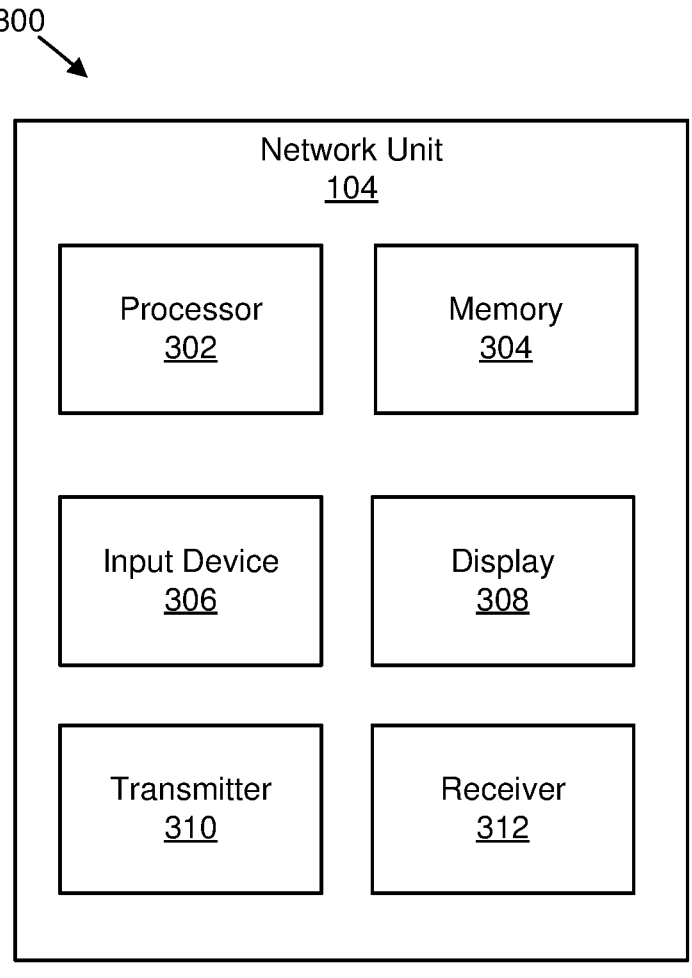
FIG. 3 is a schematic block diagram illustrating one embodiment of an apparatus that may be used for target network slice information for target network slices.

FIG. 3 depicts one embodiment of an apparatus 300 that may be used for target network slice information for target network slices. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 is configured to receive a first message from a communication device comprising information indicating a request to register a plurality of network slices. In various embodiments, the processor 302 is configured to determine target network slice information corresponding to a plurality of target network slices, wherein the target network slice information comprises information indicating network slices of the plurality of network slices not supported in an area in which the communication device is located and a frequency specific configuration associated with the plurality of target network slices. In certain embodiments, the transmitter 310 is configured to transmit a second message to a radio network entity comprising the target network slice information and the associated frequency specific configuration.

In some embodiments, the receiver 312 is configured to receive a first message from a core network entity, wherein the first message comprises target network slice information corresponding to a target network slice of a communication device, a frequency specific configuration associated with the target network slice, or a combination thereof. In various embodiments, the processor 302 is configured to determine a target cell of a plurality of cells in which the target network slice is supported. In certain embodiments, the transmitter 310 is configured to transmit a second message to the communication device, wherein the second message comprises target cell information and a request to connect with the target cell.

In various embodiments, the receiver 312 is configured to receive a first message from a communication device, wherein the first message comprises network slice preference assistance information indicating target network slice information corresponding to a plurality of target network slices of the communication device and a frequency specific configuration associated with the plurality of target network slices. In various embodiments, the processor 302 is configured to determine a mobility configuration based on the network slice preference assistance information. In certain embodiments, the transmitter 310 is configured to transmit a second message to the communication device, wherein the second message comprises the mobility configuration.

In some embodiments, network slicing features may enable network operators to optimize implementation of tailor-made functionality and network operation specific to the needs of a market scenario. In various embodiments, network slicing features may be a tool for network operators for improved support of services and specific deployment scenarios.

In certain embodiments, a network slice: may be a logical network that provides specific network capabilities and network characteristics (e.g., it permits optimized implementation of tailor-made functionality and network operation specific to the needs of a market scenario); may always consists of a RAN part and a CN part; may be identified by an S-NSSAI. While a network may support a large number of slices (e.g., hundreds), a UE need not support more than 8 slices simultaneously. Traffic for different slices may be handled by different protocol data unit ("PDU") sessions.

In some embodiments, a network slice instance: may be a set of network function ("NF") instances and may have required resources (e.g., compute, storage, and networking resources) which form a deployed network slice and may include CN C-plane and U-plane NFs and/or a next generation RAN ("NG-RAN"). Moreover, a network slice instance may be associated with one or more S-NSSAIs. Further, an S-NSSAI may be associated with one or more network slice instances. Multiple network slice instances may be associated with the same 5-NSSAI and may be deployed in the same or in different tracking areas.

In various embodiments, a network may serve a single UE with one or more network slice instances simultaneously via a fifth generation access network ("5G-AN") regardless of access types over which the UE is registered (e.g., 3GPP access and/or non-3GPP access). In certain embodiments, an AMF instance serving a UE may logically belong to each of the network slice instances serving the UE (e.g., this AMF instance may be common to the network slice instances serving a UE).

In some embodiments, an S-NSSAI uniquely identifies a network slice and may include: 1) a slice and/or service type ("SST") which may refer to an expected network slice behavior in terms of features and services—the SST field may have standardized and non-standardized values: values 0 to 127 belong to the standardized SST range and values 128 to 255 belong to an operator-specific range; and 2) a slice differentiator ("SD") which may be optional information that complements the SSTs to differentiate amongst multiple network slices of the same SST. For instance, for an SST of value enhanced mobile broadband ("eMBB"), multiple SDs may be defined such as "Company X eMBB slice", "Company Y eMBB slice," and so forth.

In various embodiments, UE subscription data in a UDM and/or an UDR may store a list of subscribed S-NSSAIs that a UE is subscribed to use in a PLMN (e.g., in a home or visited PLMN). Based on operator's policy, one or more subscribed S-NSSAIs may be marked as default S-NSSAI. If an S-NSSAI is marked as default, then a network may be expected to serve the UE with a related applicable Network Slice instance if the UE does not send any permitted S-NSSAI to the network in a registration request message as part of the requested network slice selection assistance information ("NSSAI"). A UE may be configured with the following network slice configuration: 1) allowed S-NSSAI: derived by a network from subscribed S-NSSAI; contains S-NSSAIs that are valid for a current registration area and access type provided by an AMF the UE has registered with; used by the UE (e.g., for information element ("IE") "Requested NSSAI" in a non-access stratum ("NAS") registration request message); and 2) configured S-NSSAI: derived by a network from subscribed S-NSSAI; used by the UE if there are no allowed S-NSSAIs for the current PLMN; contains only S-NSSAI values from the serving PLMN (e.g., can be the home public land mobile network ("HPLMN") or a visited public land mobile network ("VPLMN")); obtained from the AMF upon successful completion of a UE's registration procedure over an access type or as part of UE network slice configuration update procedure; used by the UE (e.g., for IE "Requested NSSAI" in the NAS registration request message).

In certain embodiments, PLMN selection and the cell selection and/or reselection may be carried out by a UE without any slice awareness. That means, upon selecting a suitable cell the UE sends an NAS registration request message which may be rejected by an AMF if the current area and/or cell does not support any of the S-NSSAIs the UE wants to register (e.g., using IE "Requested NSSAI" in a registration request message).

In some embodiments, specific frequency bands may be supported by a network slice. In such embodiments, the combination of frequency bands and network slices may be a good tool for operators requiring service isolation and/or management as well as a maximum use of 5G spectrum bands. For instance, an eMBB slice (S-NSSAI 1) may be supported only in a 2.6 GHz band (RAN Area 1) while an ultra-reliable low latency communication ("URLLC") slice (S-NSSAI 2) may be supported only in a 4.9 GHz band (RAN Area 2). In various embodiments, a lower frequency band may be used for MIoT while higher frequency bands may be used for eMBB services. If a UE is located within the coverage of RAN Area 1 as well as RAN Area 2, the UE may perform a registration procedure either via a suitable cell of RAN Area 1 or RAN Area 2. If the UE's subscribed S-NSSAIs just contain S-NSSAI 2 and the UE camps on a cell which does not support S-NSSAI 2, the registration to the network including S-NSSAI 2 may fail. In such a configuration, the UE may attempt to register from an area and/or a cell that supports S-NSSAI 2 which may take some time. But as long as the UE cannot register successfully with the indented slice, the UE is neither registered in the network nor reachable by the network by paging. Therefore, in various embodiments, a UE may perform cell selection to a cell operating in frequency bands for specific network slices.

In certain embodiments, frequency band specific configuration of network slices may be used if UE's subscribed S-NSSAIs contain both S-NSSAI 1 and S-NSSAI 2 if a UE can register successfully to any RAN Area. However, if the UE wants to initiate a URLLC service while camped on eMBB slice on RAN Area 1, then an NAS service request message sent by the UE may be rejected. As consequence, the UE may attempt to register from an area and/or a cell that supports a URLLC slice that may take some time. In some embodiments, a UE may be enabled to perform service-initiated cell selection to cells operating in frequency bands for specific network slices.

In various embodiments, to enable a UE to perform: i) cell selection if there is a radio frequency band specific slice configuration; ii) service-initiated cell selection to cells operating in frequency bands for specific network slices, the following three network-controlled methods may be used.

In a first method, an IE "Rejected NSSAI" may be extended by the following options and for each signaled S-NSSAI value in IE "Rejected NSSAI" the AMF may associate: 1) target frequency information that may contain a list of target carrier frequencies supporting rejected S-NSSAI values—the list may contain one or more entries, and for each entry a carrier frequency priority index may be associated as well—the carrier frequency priority index may be in the range of an integer (e.g., 0 . . . 7) where a value of 0 means a lowest priority and a value of 7 means a highest priority—this signaling option may be used if IE "Rejected NSSAI" is signaled between an AMF and a RAN node (e.g., as part of N2 downlink NAS transport or handover request messages), and between the RAN node and a UE (e.g., as part of the RRC release or RRC reconfiguration messages)—with this target frequency information: i) the RAN node may set the system information carrying cell reselection parameters or redirection information in the RRC release message or initiate handover to a target RAN node accordingly, ii) the UE may trigger priority-based cell reselection or handover on concerned carrier frequencies; and/or 2) target frequency information may contain a list of target frequency bands supporting rejected S-NSSAI values—the list may contain one or more entries, and for each entry a frequency band priority index may be associated as well—the frequency band priority index may be in the range of an integer (e.g., 0 . . . 7) where a value of 0 means a lowest priority and a value of 7 means a highest priority—this signaling option may be used if IE "Rejected NSSAI" is signaled between the AMF and the UE (e.g., as part of the NAS registration reject or registration accept messages)—with this target frequency information, the UE may trigger priority-based cell reselection on concerned frequency bands—in addition, this signaling option may be used if IE "Rejected NSSAI" is signaled between the AMF and the RAN node over an N2 message—with this information, the RAN node may make decision on mobility for a UE (e.g., cell reselection and handover) (e.g., set system information carrying cell reselection parameters accordingly).

In a second method, an IE "Requested NSSAI" in an NAS registration request message is extended by the parameter "Frequency band indication". With this parameter the UE may request from the AMF to receive additional information about frequency bands on which requested S-NSSAIs are supported. Alternatively, the parameter "Carrier frequency indication" may be set in the IE "Requested NSSAI". With this parameter the UE may request from the AMF to receive additional information about carrier frequencies on which the requested S-NSSAIs are supported.

In a third method, the UL RRC UEAssistanceInformation message is extended by "Slice preference assistance" information that contains frequency information for preferred slice configuration. The UE may derive frequency information for the preferred slice configuration based on the target frequency information received from rejected S-NSSAIs. This "Slice preference assistance" information may contain one or more entries. If more than one entry is contained, the given order reflects the priority of the preference (e.g., the first entry means the highest priority, and so forth). With the new "Slice preference assistance" information, the UE may indicate to a RAN node its preference to be redirected or handed over to a preferred slice configuration. The RAN node may use the received information from the UE as input for slice-specific mobility handling (e.g., setup of measurement configuration, and so forth). Instead of the UEAssistanceInformation message, any other appropriate UL RRC messages (e.g., RRCReconfigurationComplete, RRCSetupComplete, and so forth) may be used to carry the "Slice preference assistance" information.

It should be noted that, although certain embodiments found herein are described in relation to NR RAT connected to a 5G core network ("5GC"), they may also be applicable to enhanced universal terrestrial radio access ("E-UTRA") RAT connected to 5GC.

In a first embodiment: there may be RAN area coverage as described herein; a UE's configured NSSAI just contains S-NSSAI 2 (e.g., URLLC slice); after PLMN and initial cell selection, the UE is camped on a suitable cell of a RAN area that is serviced by a source RAN node; and the UE attempts to initially register to the network and sends the S-NSSAI 2 in the IE "Requested NSSAI" within the registration request message.

Figure 4:
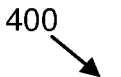
FIG. 4 is a schematic block diagram illustrating one embodiment of communications for cell selection.

FIG. 4 is a schematic block diagram illustrating one embodiment of communications 400 for cell selection according to the first embodiment. The communications 400 illustrated include communications between a UE 402, a source RAN node 404, a target RAN node 406, and an AMF 408. As may be appreciated, each of the communications 400 illustrated may include one or more messages.

In a first communication 410 transmitted between the UE 402 and the source RAN node 404, an RRC connection is established between the UE 402 and the source RAN node 404.

In a second communication 412 transmitted from the UE 402 to the source RAN node 404 and in a third communication 414 transmitted from the source RAN node 404 to the AMF 408, the UE 402 sends a registration request message (e.g., NAS registration request message) to the AMF 408. The registration request message includes a requested S-NSSAI 2.

In a fourth communication 416 transmitted from the AMF 408 to the source RAN node 404, after successful UE authentication, the AMF 408 retrieves the UE subscription information from a UDM and/or a UDR (or from an old AMF), where the subscription information contains the S-NSSAI 2 as subscribed S-NSSAI. The AMF 408 determines that S-NSSAI 2 is not supported by RAN Area 1 but by RAN Area 2. The AMF 408 sends the UE context to the source RAN node 404 including information about the rejected S-NSSAI 2 and a target carrier frequency supporting the rejected S-NSSAI 2 using an N2 message (e.g., UE initial context setup). The source RAN node 404 establishes the AS security with the UE.

In a fifth communication 418 transmitted from the AMF 408 to the UE 402, the AMF 408 sends to the UE 402 a registration reject message including S-NSSAI 2 in the IE "Rejected S-NSSAI" and a cause value "S-NSSAI is not available in the current registration area."

In a sixth communication 420 transmitted from the source RAN node 404 to the UE 402, the source RAN node 404 releases the RRC connection by sending an RRC release message to the UE 402 including target carrier frequency information (e.g., related to the rejected S-NSSAI 2). The UE 402 accepts the redirection information in the RRC release message.

In a seventh communication 422 transmitted between the UE 402 and the target RAN node 406, based on the received redirection information in the RRC release message, the UE 402 reselects a suitable cell on the indicated target carrier frequency of RAN Area 2 that is serviced by the target RAN node 406. The UE 402 and the target RAN node 406 establish an RRC connection.

In an eighth communication 424 transmitted from the UE 402 to the target RAN node 406 and a ninth communication 426 transmitted from the target RAN node 406 to the AMF 408, the UE 402 sends a registration request message (e.g., NAS registration request message) to the AMF 408 (which includes the requested S-NSSAI 2) via the target RAN node 406.

In a tenth communication 428 transmitted from the AMF 408 to the UE 402, the AMF 408 may re-authenticate the UE 402 and retrieve the subscription information (e.g., either from the UDM and/or the UDR or from the old AMF). The AMF 408 determines that S-NSSAI 2 is supported by RAN Area 2 and completes the registration procedure. The AMF 408 sends the registration accept message for the requested S-NSSAI 2 to the UE 402.

In a second embodiment: there may be RAN area coverage as described herein; a UE's configured NSSAI just contains S-NSSAI 2 (e.g., URLLC slice); after PLMN and initial cell selection, the UE is camped on a suitable cell of a RAN area that is serviced by a source RAN node; and the UE attempts to initially register to the network and sends the S-NSSAI 2 in the IE "Requested NSSAI" within the registration request message.

Figure 5:
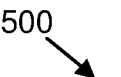
FIG. 5 is a schematic block diagram illustrating another embodiment of communications for cell selection.

FIG. 5 is a schematic block diagram illustrating another embodiment of communications 500 for cell selection. The communications 500 illustrated include communications between a UE 502, a source RAN node 504, a target RAN node 506, and an AMF 508. As may be appreciated, each of the communications 500 illustrated may include one or more messages.

In a first communication 510 transmitted between the UE 502 and the source RAN node 504, an RRC connection is established between the UE 502 and the source RAN node 504.

In a second communication 512 transmitted from the UE 502 to the source RAN node 504 and in a third communication 514 transmitted from the source RAN node 504 to the AMF 508, the UE 502 sends a registration request message (e.g., NAS registration request message) to the AMF 508. The registration request message includes a requested S-NSSAI 2.

In a fourth communication 516 transmitted from the AMF 508 to the UE 502, after establishing the NAS security and retrieving the subscription information from a UDM and/or a UDR (or from an old AMF), the AMF 508 determines that S-NSSAI 2 is not supported by RAN Area 1 and sends to the UE 502 a registration reject message containing the information about the rejected S-NSSAI 2, a cause value "S-NSSAI is not available in the current registration area," and a target frequency band supporting the rejected S-NSSAI 2.

In a fifth communication 518 transmitted from the source RAN node 504 to the UE 502, the source RAN node 504 sends an RRC release message to the UE 502 without any redirection information.

In a sixth communication 520 transmitted between the UE 502 and the target RAN node 506, based on the received target frequency band information in the registration reject message, the UE 502 reselects a suitable cell on the indicated target frequency band of RAN Area 2 that is serviced by the target RAN node 506. The UE 502 and the target RAN node 506 establish an RRC connection.

In a seventh communication 522 transmitted from the UE 502 to the target RAN node 506 and an eighth communication 524 transmitted from the target RAN node 506 to the AMF 508, the UE 502 sends a registration request message (e.g., NAS registration request message) to the AMF 508 (which includes the requested S-NSSAI 2) via the target RAN node 506.

In a ninth communication 526 transmitted from the AMF 508 to the UE 502, the AMF 508 determines that S-NSSAI 2 is supported by RAN Area 2 and sends a registration accept message for the requested S-NSSAI 2 to the UE 502.

In a third embodiment: there may be RAN area coverage as described herein; a UE's configured NSSAI just contains S-NSSAI 2 (e.g., URLLC slice); after PLMN and initial cell selection, the UE is camped on a suitable cell of a RAN area that is serviced by a source RAN node; and the UE attempts to initially register to the network and sends the S-NSSAI 2 in the IE "Requested NSSAI" within the registration request message.

Figure 6:
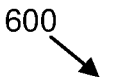
FIG. 6 is a communication diagram illustrating a further embodiment of communications for cell selection.

FIG. 6 is a communication diagram illustrating a further embodiment of communications 600 for cell selection. The communications 600 illustrated include communications between a UE 602, a source RAN node 604, a target RAN node 606, and an AMF 608. As may be appreciated, each of the communications 600 illustrated may include one or more messages.

In a first communication 610 transmitted between the UE 602 and the source RAN node 604, an RRC connection is established between the UE 602 and the source RAN node 604.

In a second communication 612 transmitted from the UE 602 to the source RAN node 604 and in a third communication 614 transmitted from the source RAN node 604 to the AMF 608, the UE 602 sends a registration request message (e.g., NAS registration request message) to the AMF 608. The registration request message includes a requested S-NSSAI 2.

In a fourth communication 616 transmitted from the AMF 608 to the source RAN node 604, the AMF 608 determines that S-NSSAI 2 is not supported by RAN Area 1 and sends the information about the rejected S-NSSAI 2 including a target carrier frequency supporting the rejected S-NSSAI 2 and a target RAN node identity to the source RAN node 604 over an N2 message (e.g., N2 downlink NAS transport).

In a fifth communication 618 transmitted between the source RAN node 604 and the target RAN node 606, based on the information received from the AMF 608, the source RAN node 604 and the target RAN node 606 prepare inter-frequency handover ("HO") including admission control, radio resource configuration in the target RAN node 606, and so forth. In this context, the following cases may occur: i) a "blind" HO (e.g., without any measurements received from the UE 602) may be performed if only signaling radio bearer ("SRB") has been setup between the UE 602 and the source RAN node 604; and ii) based on measurements that the source RAN node 604 received from the UE 602 after setup of DRBs (e.g., in case of a mobile initiated connection only ("MICO") mode).

In a sixth communication 620 transmitted from the source RAN node 604 to the UE 602, the source RAN node 604 triggers the handover by sending an RRC reconfiguration message to the UE 602. The RRC reconfiguration message contains the information about the rejected single network slice selection assistance information ("S-NSSAI") 2 and the information required to access a cell of the target RAN node 606.

The UE 602 switches 622 to a cell of the target RAN node 606.

In a seventh communication 624 transmitted from the UE 602 to the target RAN node 606, the UE 602 completes the HO procedure by sending the RRC reconfiguration complete message to the target RAN node 606.

In an eighth communication 626 transmitted from the UE 602 to the target RAN node 606 and a ninth communication 628 transmitted from the target RAN node 606 to the AMF 608, the UE 602 sends a registration request message (e.g., NAS registration request message) to the AMF 608 (which includes the requested S-NSSAI 2) via the target RAN node 606.

In a tenth communication 630 transmitted from the AMF 608 to the UE 602, the AMF 608 determines that S-NSSAI 2 is supported by RAN Area 2 and sends a registration accept message for the requested S-NSSAI 2 to the UE 602.

In a fourth embodiment there may be the following configurations: 1) frequency band specific slice configuration: frequency band 1: S-NSSAI 1, S-NSSAI 3, S-NSSAI 4; frequency band 2: S-NSSAI 2; frequency band 3: S-NSSAI 3, S-NSSAI 4, S-NSSAI 6; frequency band 4: S-NSSAI 1, S-NSSAI 2, S-NSSAI 3, S-NSSAI 4, S-NSSAI 5; 2) the UE's Configured NSSAI contains 4 slices, (e.g., S-NSSAI 1, S-NSSAI 2, S-NSSAI 3 and S-NSSAI 4); 3) after PLMN and initial cell selection, the UE is camped on a suitable cell of frequency band 1 that is serviced by a source RAN node; and 4) the UE attempts to initially register with the network for S-NSSAI 1, S-NSSAI 2, S-NSSAI 3, and S-NSSAI 4.

FIG. 7 is a communication diagram illustrating yet another embodiment of communications 700 for cell selection. The communications 700 illustrated include communications between a UE 702, a source RAN node 704, a target RAN node 706, and an AMF 708. As may be appreciated, each of the communications 700 illustrated may include one or more messages.

In a first communication 710 transmitted between the UE 702 and the source RAN node 704, an RRC connection is established between the UE 702 and the source RAN node 704.

In a second communication 712 transmitted from the UE 702 to the source RAN node 704 and in a third communication 714 transmitted from the source RAN node 704 to the AMF 708, the UE 702 sends a registration request message (e.g., NAS registration request message) to the AMF 708. The registration request message includes requested S-NSSAI 1, S-NSSAI 2, S-NSSAI 3, and S-NSSAI 4. In addition, the UE 702 sets the parameter "Frequency band indication" to request from the AMF 708 to receive additional information about the frequency bands on which the requested S-NSSAIs are supported.

In a fourth communication 716 transmitted from the AMF 708 to the source RAN node 704, the AMF 708 determines that S-NSSAI 1, S-NSSAI 3, and S-NSSAI 4 are supported by the source RAN node 704 but not S-NSSAI 2. As result, the AMF 708 sends the information about the allowed S-NSSAI 1, S-NSSAI 3, and S-NSSAI 4, and rejected S-NSSAI 2, and for S-NSSAI 2 the AMF 708 sends the frequency band information. The information about allowed and/or rejected S-NSSAIs is sent to the source RAN node 704 over an N2 message (e.g., N2 downlink NAS transport) (e.g., allowed S-NSSAI: S-NSSAI 1, S-NSSAI 3, S-NSSAI 4; rejected S-NSSAI: S-NSSAI 2 supported on frequency band 2, frequency band 4).

In a fifth communication 718 transmitted from the AMF 708 to the UE 702, the AMF 708 sends a registration accept message to the UE 702 with the same information for allowed and/or rejected S-NSSAIs as in the fourth communication 716.

In a sixth communication 720 transmitted from the UE 702 to the source RAN node 704, the UE 702 processes the received information from the AMF 708 and decides to send a UE 702 assistance information message to the source RAN node 704. The assistance information message may include "Slice preference assistance" information that is set to frequency band 4. With this the UE 702 indicates to the source RAN node 704 its preference to be redirected or handed over to the slice configuration on frequency band 4 on which all configured S-NSSAIs are supported. The source RAN node 704 may then decide whether to act on the UE 702 preference indication or not. For example, the source RAN node 704 may setup measurement configuration on the concerned frequency band 4.

In a fifth embodiment there may be the following configurations: there may be RAN area coverage as described herein; a UE's configured NSSAI contain both S-NSSAI 1 and S-NSSAI 2; after PLMN and initial cell selection the UE is camped on a suitable cell of RAN Area 1 that is serviced by a source RAN node; and the UE attempts to initially register to the network and sends S-NSSAI 1 and S-NSSAI 2 in the IE "Requested NSSAI" within a registration request message.

Figure 8:
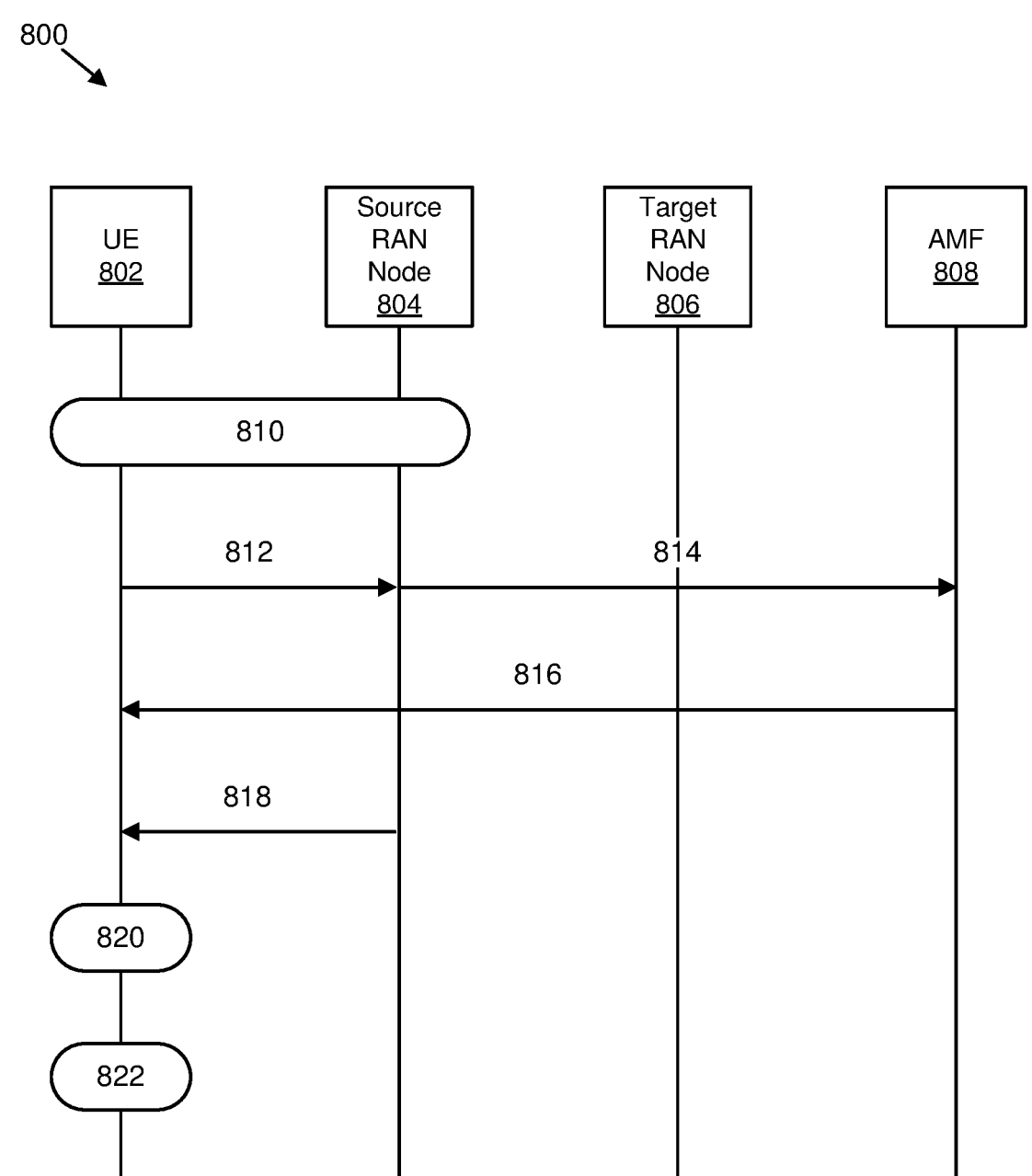
FIG. 8 is a communication diagram illustrating a further embodiment of communications for cell selection.

FIG. 8 is a communication diagram illustrating a further embodiment of communications 800 for cell selection. The communications 800 illustrated include communications between a UE 802, a source RAN node 804, a target RAN node 806, and an AMF 808. As may be appreciated, each of the communications 800 illustrated may include one or more messages.

In a first communication 810 transmitted between the UE 802 and the source RAN node 804, an RRC connection is established between the UE 802 and the source RAN node 804.

In a second communication 812 transmitted from the UE 802 to the source RAN node 804 and in a third communication 814 transmitted from the source RAN node 804 to the AMF 808, the UE 802 sends a registration request message (e.g., NAS registration request message) to the AMF 808. The registration request message includes a requested S-NSSAI 1 and S-NSSAI 2. In addition, the UE 802 sets the parameter "Frequency band indication" to request from the AMF 808 to receive additional information about the frequency bands on which the requested S-NSSAIs are supported.

In a fourth communication 816 transmitted from the AMF 808 to the UE 802, after successful UE 802 authentication, the AMF 808 retrieves the UE 802 subscription information from a UDM and/or a UDR (or from old AMF) and the subscription information contains the S-NSSAI 1 and S-NSSAI 2 as subscribed S-NSSAI. The AMF 808 determines that S-NSSAI 1 is supported by the source RAN node 804 but not S-NSSAI 2. As result, the AMF 808 sends to the UE 802 a registration accept message containing information about the allowed S-NSSAI 1, the rejected S-NSSAI 2, and the frequency band information for the rejected S-NSSAI 2.

In a fifth communication 818 transmitted from the source RAN node 804 to the UE 802, the source RAN node 804 sends an RRC release message to the UE 802 without any redirection information.

The UE 802 NAS initiates 820 a URLLC service for S-NSSAI 2.

Based on the frequency band information for S-NSSAI 2 received in the fourth communication 816, the UE 802 performs 822 cell reselection to a suitable cell that is serviced by the target RAN node 806.

In a sixth communication 824 transmitted between the UE 802 and the target RAN node 806, an RRC connection is established between the UE 802 and the target RAN node 806.

In a seventh communication 826 transmitted from the UE 802 to the target RAN node 806 and an eighth communication 828 transmitted from the target RAN node 806 to the AMF 808, the UE 802 sends a service request message (e.g., NAS service request message) to the AMF 808. The service request message may include the requested URLLC service and encapsulated NAS registration request message containing the requested S-NSSAI 2 via the target RAN node 806.

FIG. 9 is a flow chart diagram illustrating one embodiment of a method 900 for target network slice information for target network slices. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 a first message from a communication device comprising information indicating a request to register a plurality of network slices. In some embodiments, the method 900 includes determining 904 target network slice information corresponding to a plurality of target network slices, wherein the target network slice information comprises information indicating network slices of the plurality of network slices not supported in an area in which the communication device is located and a frequency specific configuration associated with the plurality of target network slices. In certain embodiment, the method 900 includes transmitting 906 a second message to a radio network entity comprising the target network slice information and the associated frequency specific configuration.

In certain embodiments, the first message is received from the communication device by way of a first radio network entity. In some embodiments, the area in which the communication device is located comprises a cell of a tracking area or a plurality of cells of the tracking area. In various embodiments, the frequency specific configuration associated with the plurality of target network slices comprises a configuration of frequency carriers, frequency bands, frequency priorities, or some combination thereof.

In one embodiment, receiving the first message comprises receiving the first message at an access and mobility management function. In certain embodiments, the first message comprises a request for frequency specific configuration associated with the plurality of network slices to register. In some embodiments, a third message is transmitted to a communication device, and the third message comprises the target network slice information and the associated frequency specific configuration.

FIG. 10 is a flow chart diagram illustrating another embodiment of a method 1000 for target network slice information for target network slices. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 a first message from a core network entity, wherein the first message comprises target network slice information corresponding to a target network slice of a communication device, a frequency specific configuration associated with the target network slice, or a combination thereof. In some embodiments, the method 1000 includes determining 1004 a target cell of a plurality of cells in which the target network slice is supported. In various embodiments, the method 1000 includes transmitting 1006 a second message to the communication device, wherein the second message comprises target cell information and a request to connect with the target cell.

In certain embodiments, the second message comprises a radio resource control connection release message or a radio resource control connection reconfiguration message. In some embodiments, the core network entity comprises an access and mobility management function. In various embodiments, the target network slice information comprises information indicating network slices of a plurality of network slices not supported in an area in which the communication device is located.

FIG. 11 is a flow chart diagram illustrating a further embodiment of a method 1100 for target network slice information for target network slices. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102 a first message from a communication device, wherein the first message comprises network slice preference assistance information indicating target network slice information corresponding to a plurality of target network slices of the communication device and a frequency specific configuration associated with the plurality of target network slices. In some embodiments, the method 1100 includes determining 1104 a mobility configuration based on the network slice preference assistance information. In various embodiments, the method 1100 includes transmitting 1106 a second message to the communication device, wherein the second message comprises the mobility configuration.

In certain embodiments, the mobility configuration comprises configuration information for measurements or a handover.

Figure 12:
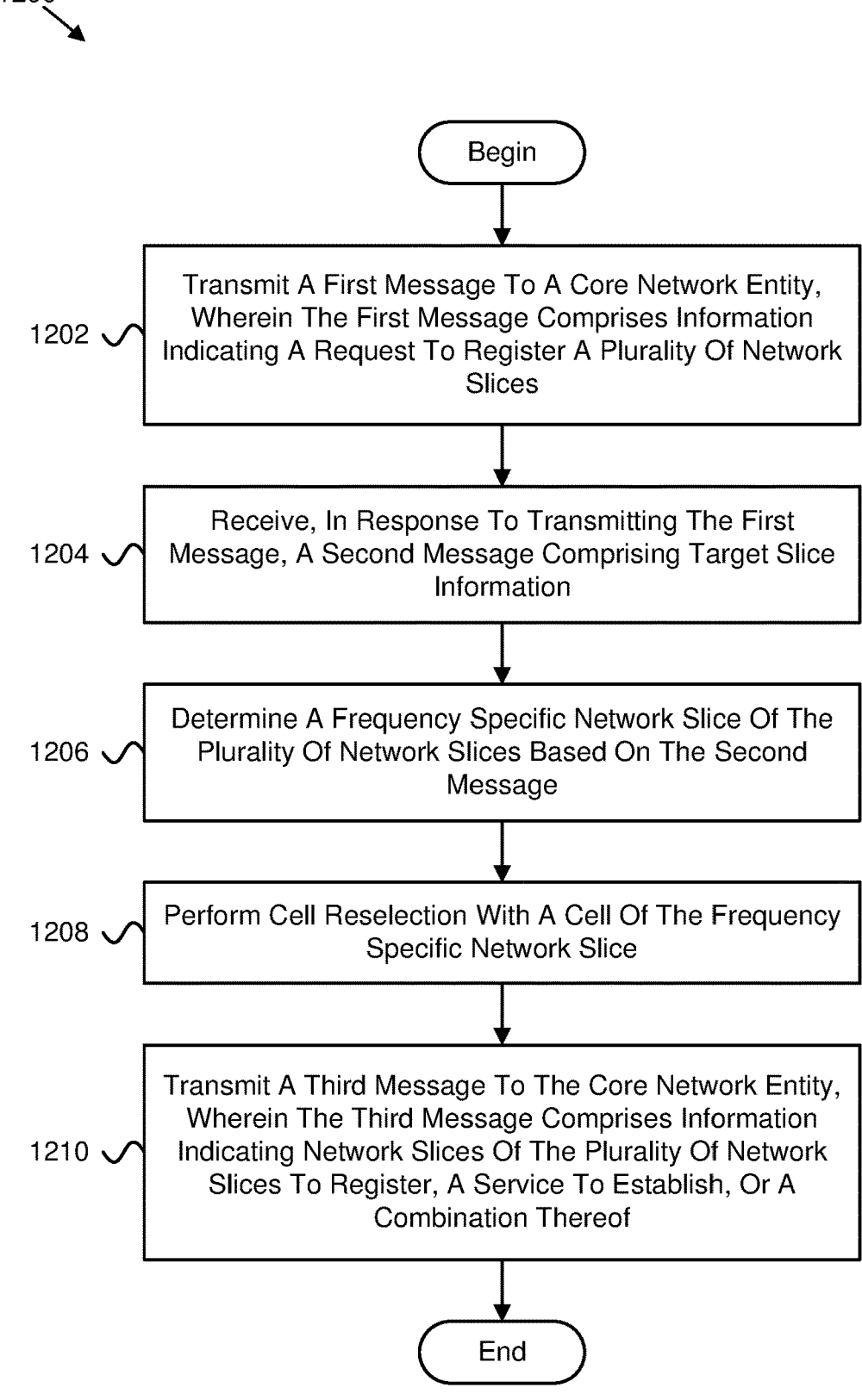
FIG. 12 is a flow chart diagram illustrating yet another embodiment of a method for using target network slice information for target network slices.

FIG. 12 is a flow chart diagram illustrating yet another embodiment of a method 1200 for target network slice information for target network slices. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes transmitting 1202 a first message to a core network entity, wherein the first message comprises information indicating a request to register a plurality of network slices. In some embodiments, the method 1200 includes receiving 1204, in response to transmitting the first message, a second message comprising target slice information. In certain embodiments, the method 1200 includes determining 1206 a frequency specific network slice of the plurality of network slices based on the second message. In various embodiments, the method 1200 includes performing 1208 cell reselection with a cell of the frequency specific network slice. In some embodiments, the method 1200 includes transmitting 1210 a third message to the core network entity, wherein the third message comprises information indicating network slices of the plurality of network slices to register, a service to establish, or a combination thereof.

In certain embodiments, the first message is transmitted to the core network entity by way of the first radio network entity. In some embodiments, the first message comprises a request for a frequency specific configuration associated with the plurality of network slices to register.

In various embodiments, the second message comprises a frequency specific configuration associated with the target network slice information. In one embodiment, the core network entity comprises an access and mobility management function.

FIG. 13 is a flow chart diagram illustrating another embodiment of a method 1300 for target network slice information for target network slices. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes transmitting 1302 a first message to a radio network entity, wherein the first message comprises network slice preference assistance information indicating target network slice information corresponding to a plurality of target network slices of a communication device and a frequency specific configuration associated with the plurality of target network slices. In some embodiments, the method 1300 includes receiving 1304, in response to transmitting the first message, a second message from a radio network entity comprising a mobility configuration.

In one embodiment, a method comprises: receiving a first message from a communication device comprising information indicating a request to register a plurality of network slices; determining target network slice information corresponding to a plurality of target network slices, wherein the target network slice information comprises information indicating network slices of the plurality of network slices not supported in an area in which the communication device is located and a frequency specific configuration associated with the plurality of target network slices; and transmitting a second message to a radio network entity comprising the target network slice information and the associated frequency specific configuration.

In certain embodiments, the first message is received from the communication device by way of a first radio network entity.

In some embodiments, the area in which the communication device is located comprises a cell of a tracking area or a plurality of cells of the tracking area.

In various embodiments, the frequency specific configuration associated with the plurality of target network slices comprises a configuration of frequency carriers, frequency bands, frequency priorities, or some combination thereof.

In one embodiment, receiving the first message comprises receiving the first message at an access and mobility management function.

In certain embodiments, the first message comprises a request for frequency specific configuration associated with the plurality of network slices to register.

In some embodiments, a third message is transmitted to a communication device, and the third message comprises the target network slice information and the associated frequency specific configuration.

In one embodiment, an apparatus comprises: a receiver configured to receive a first message from a communication device comprising information indicating a request to register a plurality of network slices; a processor configured to determine target network slice information corresponding to a plurality of target network slices, wherein the target network slice information comprises information indicating network slices of the plurality of network slices not supported in an area in which the communication device is located and a frequency specific configuration associated with the plurality of target network slices; and a transmitter configured to transmit a second message to a radio network entity comprising the target network slice information and the associated frequency specific configuration.

In certain embodiments, the first message is received from the communication device by way of a first radio network entity.

In some embodiments, the area in which the communication device is located comprises a cell of a tracking area or a plurality of cells of the tracking area.

In various embodiments, the frequency specific configuration associated with the plurality of target network slices comprises a configuration of frequency carriers, frequency bands, frequency priorities, or some combination thereof.

In one embodiment, the receiver configured to receive the first message comprises the receiver configured to receive the first message at an access and mobility management function.

In certain embodiments, the first message comprises a request for frequency specific configuration associated with the plurality of network slices to register.

In some embodiments, a third message is transmitted to a communication device, and the third message comprises the target network slice information and the associated frequency specific configuration.

In one embodiment, a method comprises: receiving a first message from a core network entity, wherein the first message comprises target network slice information corresponding to a target network slice of a communication device, a frequency specific configuration associated with the target network slice, or a combination thereof; determining a target cell of a plurality of cells in which the target network slice is supported; and transmitting a second message to the communication device, wherein the second message comprises target cell information and a request to connect with the target cell.

In certain embodiments, the second message comprises a radio resource control connection release message or a radio resource control connection reconfiguration message.

In some embodiments, the core network entity comprises an access and mobility management function.

In various embodiments, the target network slice information comprises information indicating network slices of a plurality of network slices not supported in an area in which the communication device is located.

In one embodiment, an apparatus comprises: a receiver configured to receive a first message from a core network entity, wherein the first message comprises target network slice information corresponding to a target network slice of a communication device, a frequency specific configuration associated with the target network slice, or a combination thereof; a processor configured to determine a target cell of a plurality of cells in which the target network slice is supported; and a transmitter configured to transmit a second message to the communication device, wherein the second message comprises target cell information and a request to connect with the target cell.

In certain embodiments, the second message comprises a radio resource control connection release message or a radio resource control connection reconfiguration message.

In some embodiments, the core network entity comprises an access and mobility management function.

In various embodiments, the target network slice information comprises information indicating network slices of a plurality of network slices not supported in an area in which the communication device is located.

In one embodiment, a method comprises: receiving a first message from a communication device, wherein the first message comprises network slice preference assistance information indicating target network slice information corresponding to a plurality of target network slices of the communication device and a frequency specific configuration associated with the plurality of target network slices; determining a mobility configuration based on the network slice preference assistance information; and transmitting a second message to the communication device, wherein the second message comprises the mobility configuration.

In certain embodiments, the mobility configuration comprises configuration information for measurements or a handover.

In one embodiment, an apparatus comprises: a receiver configured to receive a first message from a communication device, wherein the first message comprises network slice preference assistance information indicating target network slice information corresponding to a plurality of target network slices of the communication device and a frequency specific configuration associated with the plurality of target network slices; a processor configured to determine a mobility configuration based on the network slice preference assistance information; and a transmitter configured to transmit a second message to the communication device, wherein the second message comprises the mobility configuration.

In certain embodiments, the mobility configuration comprises configuration information for measurements or a handover.

In one embodiment, a method comprises: transmitting a first message to a core network entity, wherein the first message comprises information indicating a request to register a plurality of network slices; receiving, in response to transmitting the first message, a second message comprising target slice information; determining a frequency specific network slice of the plurality of network slices based on the second message; performing cell reselection with a cell of the frequency specific network slice; and transmitting a third message to the core network entity, wherein the third message comprises information indicating network slices of the plurality of network slices to register, a service to establish, or a combination thereof.

In certain embodiments, the first message is transmitted to the core network entity by way of the first radio network entity.

In some embodiments, the first message comprises a request for a frequency specific configuration associated with the plurality of network slices to register.

In various embodiments, the second message comprises a frequency specific configuration associated with the target network slice information.

In one embodiment, the core network entity comprises an access and mobility management function.

In one embodiment, an apparatus comprises: a transmitter configured to transmit a first message to a core network entity, wherein the first message comprises information indicating a request to register a plurality of network slices; a receiver configured to receive, in response to transmitting the first message, a second message comprising target slice information; and a processor configured to: determine a frequency specific network slice of the plurality of network slices based on the second message; and perform cell reselection with a cell of the frequency specific network slice; wherein the transmitter is configured to transmit a third message to the core network entity, and the third message comprises information indicating network slices of the plurality of network slices to register, a service to establish, or a combination thereof.

In certain embodiments, the first message is transmitted to the core network entity by way of the first radio network entity.

In some embodiments, the first message comprises a request for a frequency specific configuration associated with the plurality of network slices to register.

In various embodiments, the second message comprises a frequency specific configuration associated with the target network slice information.

In one embodiment, the core network entity comprises an access and mobility management function.

In one embodiment, a method comprises: transmitting a first message to a radio network entity, wherein the first message comprises network slice preference assistance information indicating target network slice information corresponding to a plurality of target network slices of a communication device and a frequency specific configuration associated with the plurality of target network slices; and receiving, in response to transmitting the first message, a second message from a radio network entity comprising a mobility configuration.

In one embodiment, an apparatus comprises: a transmitter configured to transmit a first message to a radio network entity, wherein the first message comprises network slice preference assistance information indicating target network slice information corresponding to a plurality of target network slices of a communication device and a frequency specific configuration associated with the plurality of target network slices; and a receiver configured to receive, in response to transmitting the first message, a second message from a radio network entity comprising a mobility configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a first network entity, the method comprising:
   receiving, from a user equipment (UE), a first message comprising information indicating a request to register a plurality of network slices;
   determining target network slice information corresponding to a plurality of target network slices, wherein the target network slice information comprises information indicating network slices of the plurality of network slices not supported in a current tracking area (TA); and
   transmitting a second message to a second network entity comprising the target network slice information, wherein the second message further indicates frequency specific configuration associated with the target network slice information, and wherein the frequency specific configuration enables use of the network slices not supported in the current TA.

2. The method of claim 1, wherein the area in which the UE is located comprises a cell of a tracking area or a plurality of cells of the tracking area.

3. The method of claim 1, wherein the frequency specific configuration associated with the plurality of target network slices comprises a configuration of frequency carriers, frequency bands, frequency priorities, or some combination thereof.

4. The method of claim 1, wherein receiving the first message comprises receiving the first message at an access and mobility management function.

5. The method of claim 1, wherein the first message comprises a request for frequency specific configuration associated with the plurality of network slices to register.

6. The method of claim 1, wherein a third message is transmitted to a UE, and the third message comprises the target network slice information and the associated frequency specific configuration.

7. A first network entity, comprising:
   at least one memory; and
   at least one processor coupled with the at least one memory and configured to cause the first network entity to:
      receive, from a user equipment (UE), a first message comprising information indicating a request to register a plurality of network slices;
      determine target network slice information corresponding to a plurality of target network slices, wherein the target network slice information comprises information indicating network slices of the plurality of network slices not supported in a current tracking area (TA); and
      transmit a second message to a second network entity comprising the target network slice information, wherein the second message further indicates frequency specific configuration associated with the target network slice information, and wherein the frequency specific configuration enables use of the network slices not supported in the current TA.

8. The first network entity of claim 7, wherein the at least one processor is configured to cause the first network entity to receive the first message at an access and mobility management function.

9. A second network entity, comprising:
   at least one memory; and
   at least one processor coupled with the at least one memory and configured to cause the second network entity to:
      receive a first message from a first network entity, wherein the first message comprises target network slice information corresponding to a target network slice of a communication device, a frequency specific configuration associated with the target network slice, or a combination thereof;
      determine a target cell of a plurality of cells in which the target network slice is supported; and
      transmit a second message to a user equipment (UE), wherein the second message comprises target cell information and a request to connect with the target cell, wherein the target network slice information comprises information indicating network slices of a plurality of network slices not supported in a current tracking area (TA), and wherein the frequency specific configuration enables use of the network slices not supported in the current TA.

10. The method of claim 1, wherein transmitting the second message comprises transmitting the second message to a radio network entity.

11. The first network entity of claim 7, wherein the area in which the UE is located comprises a cell of a tracking area or a plurality of cells of the tracking area.

12. The first network entity of claim 7, wherein the frequency specific configuration associated with the plurality of target network slices comprises a configuration of frequency carriers, frequency bands, frequency priorities, or some combination thereof.

13. The first network entity of claim 7, wherein the at least one processor is configured to cause the first network entity to transmit the second message to a radio network entity.

14. The second network entity of claim 9, wherein the first network entity comprises an access and mobility management function (AMF).

15. The second network entity of claim 9, wherein the at least one processor is configured to cause the second network entity to receive the first message at a radio access entity.

16. The second network entity of claim 9, wherein the second message comprises a radio resource control connection release message or a radio resource control connection reconfiguration message.

17. The second network entity of claim 9, wherein the target network slice information comprises information indicating network slices of a plurality of network slices not supported in an area in which the UE is located.

18. The second network entity of claim 9, wherein the frequency specific configuration associated with the target network slice comprises a configuration of frequency carriers, frequency bands, frequency priorities, or some combination thereof.

\* \* \* \* \*